Sept. 25, 1928.

P. ABÁLSAMO 1,685,184

SLICING MACHINE

Filed Oct. 8, 1926

Inventor
Pascual Abálsamo,

By

Attorney

Sept. 25, 1928.   P. ABÁLSAMO   1,685,184
SLICING MACHINE
Filed Oct. 8, 1926   3 Sheets-Sheet 2
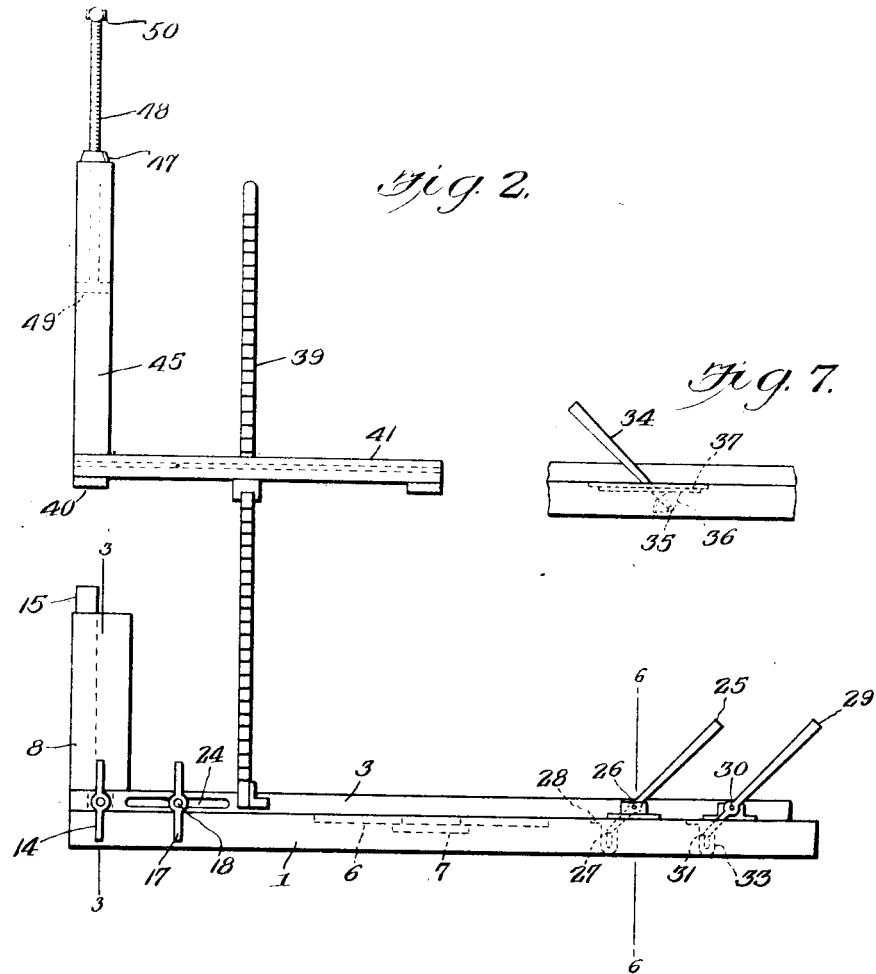
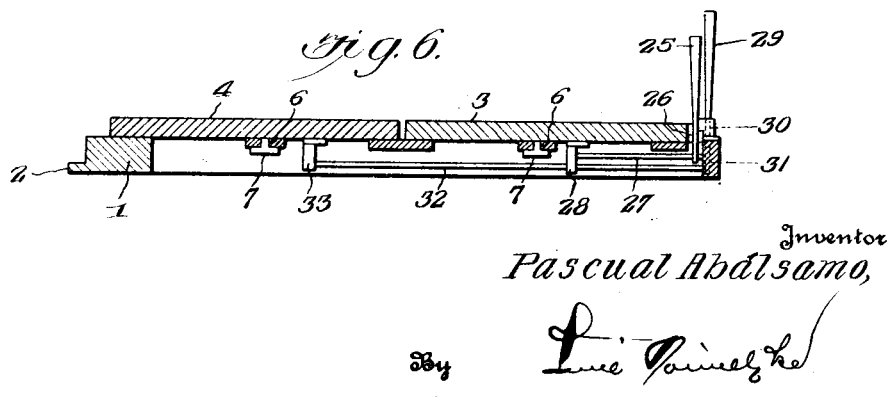
Inventor
Pascual Abálsamo,
By
Attorney Inventor
Pascual Abálsamo, Patented Sept. 25, 1928.

1,685,184

UNITED STATES PATENT OFFICE.

PASCUAL ABÁLSAMO, OF BUENOS AIRES, ARGENTINA.

SLICING MACHINE.

Application filed October 8, 1926, Serial No. 140,307, and in Argentina July 26, 1926.

This invention relates to machines for cutting ham, cold meat products and the like, and has for its object certain improvements whereby several kinds of cold meat or the like may be cut simultaneously.

The invention also has certain other objects which will be described in the course of this specification and will be particularly pointed out in the appended claims.
In order that the invention may be readily understood and carried into practice, a preferred form of construction of the same has been represented, by way of example, in the accompanying illustrative drawings, wherein:

Figure 2 is a side elevation of the same.

Figure 6 is a vertical section on the line 6—6 of Figure 2,
and Figure 7 is a detail view showing a modification of the operating levers for effecting the receding or backward stroke of the sliding plates.

In all the said views, the same numbers of reference have been used to indicate like or corresponding parts.

Figure 1:
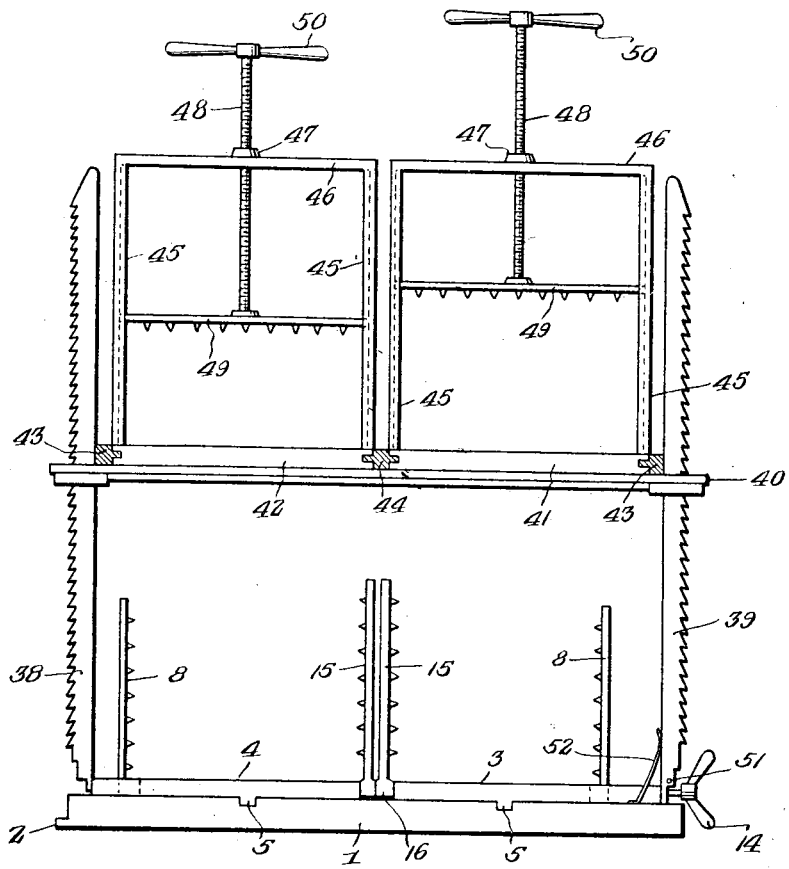
Figure 1 is a front elevation of the improved machine.
Figure 3:
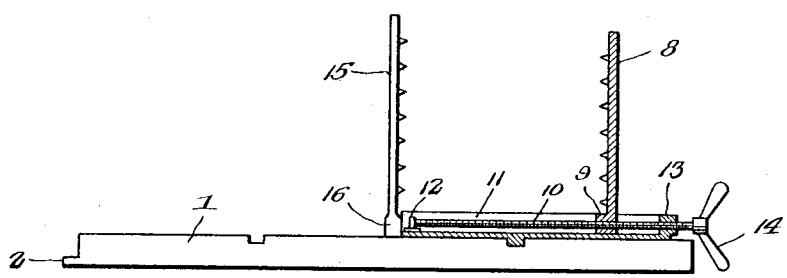
Figure 3 is a vertical section on the line 3—3 of Figure 2.
Figure 4:
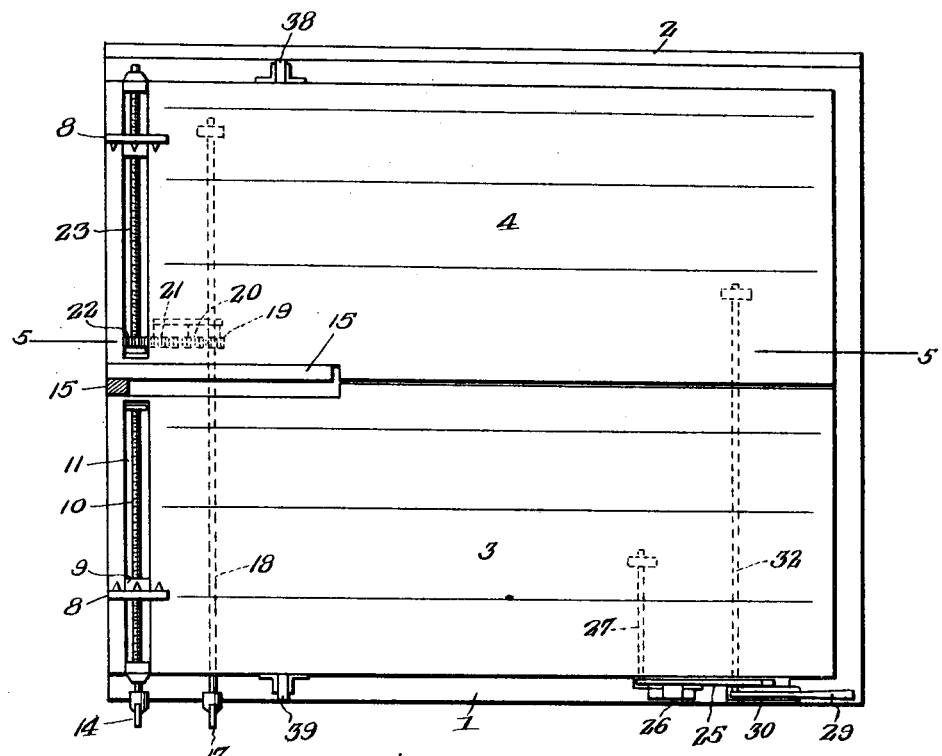
Figure 4 is a plan view of the lower part of the machine.
Figure 5:
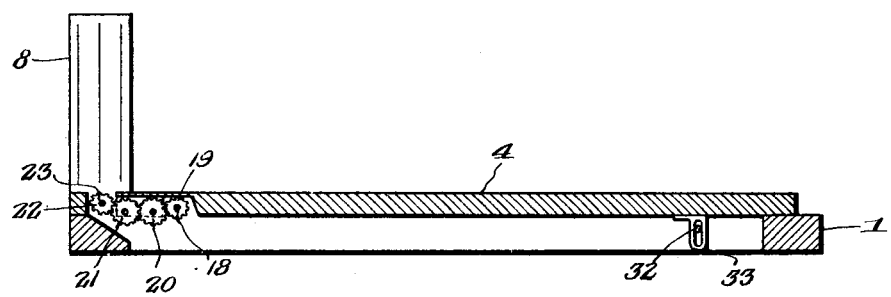
Figure 5 is a vertical section on the line 5—5 of Figure 4.

In the following description, no reference will be made to unmodified parts or features of cold meat cutting machines of the usual type, and I desire it to be clearly understood that the improvements in accordance with this invention may be applied to existing machines and may also be the object of a novel type of machine.

It should also be understood that this invention is not limited to the embodiment shown and described, but that many changes of construction and detail may be adopted without departing from the general scope of the invention, as claimed.

In the embodiment shown, 1 indicates the usual base plate of a machine for cutting ham or cold meat, inserted by means of the guide rib 2 in the corresponding groove of the carriage (not shown) and secured in position in the usual way. There are arranged longitudinally on said plate 1 two sliding plates 3 and 4, guided by means of longitudinal ribs 5 provided on their lower faces, which ribs are formed with grooves 6 of suitable length that slidably receive therein flanged guide pieces 7 rigidly secured to the base plate, whereby the sliding plates 3 and 4 are held in position.

At the outer side of each of the plates 3 and 4, the transversely shiftable standards 8 are mounted, each provided with a lower enlarged internally threaded end 9, in which engages a screw shaft, placed in a slot formed in the respective sliding plate. The screw 10 associated with plate 3 is journalled in bearings 12 and 13, mounted in the slot 11 in said plate, and it carries wings 14 or the like on its outer end for rotating it in the direction desired.

At their inner sides, the sliding plates 3 and 4 carry the pivoted standards 15 adapted to assume either a vertical position or a horizontal position parallel to the surface of the plates by swinging said standards on the pivots 16. For operating the outer slidable standard 8 of the plate 4, a rotatable rod 18 having a winged head 17 is used, suitably guided by supporting pieces and carrying a gear wheel 19 which, through the gear wheels 20 and 21, drives a gear wheel 22 fast on the screw shaft 23 whereon the standard 8 of the above mentioned plate 4 is mounted.

By means of the arrangement described, it will be seen that by rotating the winged pieces 14 and 17, the position of the standards 8 may be varied, and that when the pivoted standards 15 are in their adjusted horizontal position, the meat or other product supported on the plates 3 and 4 will be securely clamped in place, said plates being at the same time held at the foremost end of their forward stroke. This as regards the operation of the apparatus when one single piece of meat or the like is to be treated.

When two hams or pieces of meat or the like are to be sliced, the standards 15 are raised and the products to be cut are placed one on each of the plates 3 and 4, being clamped in position by approaching the sliding standards 8. In order to prevent simultaneous operation with both of said plates, it will be necessary to move back one plate to a position where it cannot be reached by the cutting blade. For this purpose, any suitable or desired device may be used, such as for instance, the means represented in the drawings.

Referring to the plate 3, at the side of the base plate 1 which is acted upon by the screw shaft of the machine, a lever 25 is pivoted at 26, having rigidly connected to its lower free end a rod 27 which is engaged in a depending eye 28, secured to the lower surface of the plate 3. Similarly, in order to cause the displacement of the plate 4, another lever 29 is provided, pivoted at 30 to the plate 1 and having connected to its lower free end 31, a rod 32 which engages an eye 33, rigidly secured to the lower surface of said plate 4. The operation will be readily understood, so that no further explanation is deemed necessary.

Similar results may be attained by other mechanical means, such, for instance, as shown in Figure 7, according to which the sliding motion of the plates 3 and 4 is obtained by means of levers 34, pivoted at 35 to the plate 1 and carrying rods formed with toothed segments 36 engaging with racks 37, rigidly secured to the lower surface of each of the plates 3 and 4.

When desired, and in accordance with this invention, the apparatus may be constructed so as to work with a supplementary gang or upper series of cutting devices, provided with two plates and similar in construction to the lower series described, said upper series or set, indicated at 40 in Figures 1 and 2, being arranged to take support on the articles of food being operated on by the lower set and secured in position by means of the two toothed vertical standards 38 and 39, of which one is fixed and the other pivoted, being connected by means of a hinge 51 and a suitable spring 52 to the lower base plate 1, as may be seen by referring to Figure 1.

The arrangement of the upper base plate may be exactly similar in all details to that of the lower set, but, when desired, a different form may also be adopted, such, for instance as that illustrated, in which 41 and 42 are sliding plates similar to the plates 3 and 4, guided in the lateral guide ways 43 and in a central common guide way 44. On each of said sliding plates 41 and 42 is mounted a pair of vertical standards 45, connected at their upper ends by means of a bridge 46, at the middle of which is arranged a collar 47 through which passes a screw 48 having jointed to its lower end a pressure plate 49, suitably guided in its rise and descent by said vertical standards 45. The rise or descent of said plate is caused by rotating the screw spindle 48 by its handle 50 or other suitable means. By means of said pressure plate, the product to be cut is securely held in the desired position. Each of said plates 41 and 42 is provided with suitable means, similar, if desired, to those provided in connection with the lower set, for causing the displacement in a forward and backward direction of the sliding plates.

The operation of the apparatus will be readily understood without further explanation by persons skilled in the art.

It will be evident that the surfaces of the standards which will be placed in contact with the goods to be treated in order to secure the same in position, will preferably be serrated or roughened in order to enhance their gripping action and the same applies to the corresponding surfaces of the supporting plates and pressure plates of the apparatus.

From the foregoing description it will be seen that the essential feature of this invention consists in arranging on the usual supporting plate of a machine for cutting ham or other cold meat products, supplementary sliding plates each provided with separate means for holding the meat in position, and each also provided with means for causing it to recede to a position in which the cutting blade will be prevented from acting on the meat supported thereby.

Having now clearly described and determined the nature of my said invention and in what manner the same is to be performed, I declare that what I claim and desire to secure by Letters Patent, is:

1. In a food-slicing machine of the type comprising a movable feed carriage, the combination of a sliding feed plate supported longitudinally upon the carriage to move in unison therewith; a lever pivotally mounted on the carriage and having a pin-and-slot connection with the plate to advance or retract said plate at will relatively to the carriage; and means on the feed plate for retaining thereon the food to be sliced.

2. In a food-slicing machine of the type comprising a movable feed carriage, the combination of a sliding feed plate supported longitudinally upon the carriage to move in unison therewith; means for advancing or retracting said plate at will relatively to the carriage; a screw shaft mounted transversely in the plate at the front end thereof; a standard pivotally mounted at the front end of said plate for movement between an active vertical position and an inactive horizontal position substantially in the plane of the plate, and having a portion to engage and retain the food; a vertical retaining standard mounted on said screw to travel along the same toward or from the first standard; and means for rotating the screw.

3. In a food-slicing machine of the type comprising a movable feed carriage, the combination of a sliding feed plate supported longitudinally upon the carriage to move in unison therewith; means for advancing or retracting said plate at will relatively to the carriage; a vertical standard mounted to travel laterally in either direction across the front end of the plate and having a portion thereof adapted to engage and retain the food; and a pivoted retaining standard at the front inner corner of said plate movable between an inactive horizontal position substantially in the plane of the plate and an active vertical position for coaction with the traveling standard.

In testimony whereof I affix my signature.

PASCUAL ABÁLSAMO.